Aug. 20, 1940.   G. M. KRIEGBAUM   2,211,899
SEAL
Filed March 12, 1938   2 Sheets-Sheet 1

Inventor
George M. Kriegbaum
By V. F. Larragne,
Atty.

Aug. 20, 1940.  G. M. KRIEGBAUM  2,211,899
SEAL
Filed March 12, 1938  2 Sheets-Sheet 2
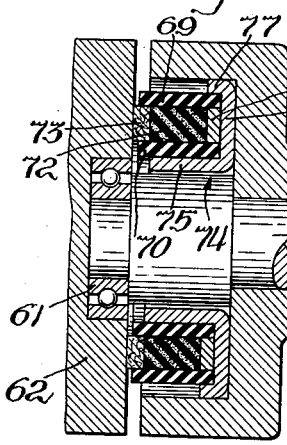
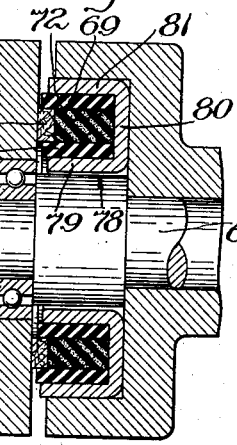
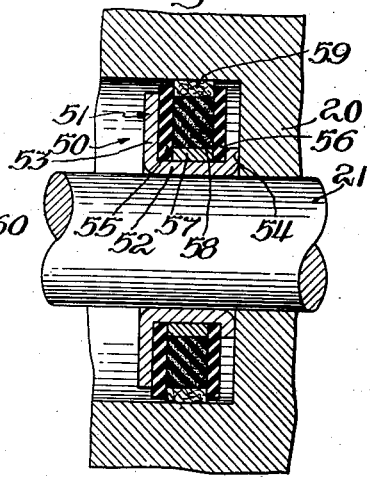
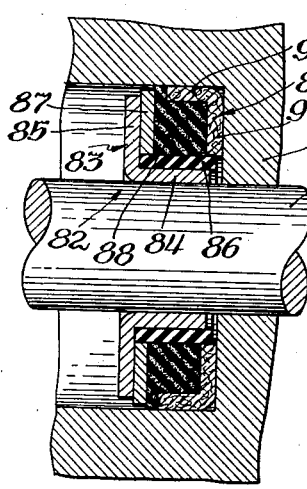
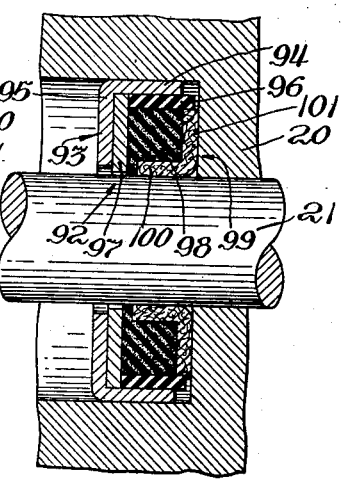
Inventor
George M. Kriegbaum
By V. F. Lavagne
Atty.

Patented Aug. 20, 1940

2,211,899

UNITED STATES PATENT OFFICE 2,211,899

SEAL

George M. Kriegbaum, Richmond, Ind., assignor to International Harvester Company, a corporation of New Jersey Application March 12, 1938, Serial No. 195,522

1 Claim. (Cl. 288—3)

This invention relates to a dust or oil seal. More specifically it is concerned with a seal comprising a ring of oil absorbent felt, and soft resilient oil resisting rubber with the latter placed under compression when the seal is installed whereby to keep the felt ring at all times pressed against the surface to be sealed.

It is customary to provide a seal between parts for preventing the escape of oil or other lubricant from inside the parts and the entrance of dust into the parts. Normally, a certain amount of oil escapes and dust becomes mixed with it. This mixture in contact with the seal prevents further escape of the oil and entrance of the dust into the parts.

An object of the present invention is accordingly to provide a seal for preventing the escape of lubricant from and entrance of dust or other foreign particles into an element carrying a lubricant.

A further object of the invention is the provision of a seal for preventing the escape of lubricant from parts.

Another object is to provide a seal for preventing the entrance of dust into the parts.

Other objects will appear as the disclosure is more fully made.

According to the present invention, the seal comprises essentially a casing and packing elements associated therewith, including a fibrous oil absorbent ring such as felt, and soft resilient oil-resisting rubber such as sponge rubber as a resilient backing therefor. This seal may be associated with a surface to be sealed in a variety of ways, as the detailed description will show.

In the drawings:

Figures 5 to 9 show various forms of a second type of seal; and,

Figures 10 and 11 show two forms of a third type of seal.

Figure 1:
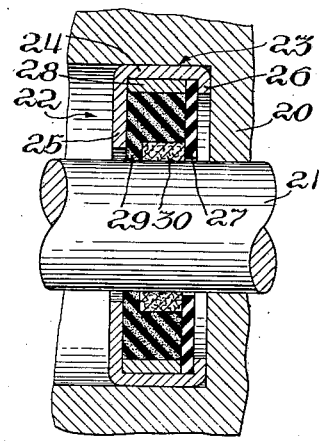
Figures 1 to 4 show various forms of a first type of seal.

As seen in Figure 1, there is a housing 20 in which a shaft 21 is rotatably mounted. A seal 22 is carried between the shaft and housing and comprises a casing 23 formed of sheet metal, a hard oil-resisting rubber ring 27 formed of Neoprene or the like, a spacer ring 28 formed of sheet metal, a soft resilient oil-resisting sponge rubber ring 29 also formed of Neoprene or the like, and a felt ring 30. The metal casing comprises a cylindrical wall 24, a radial wall 25 extending inwardly from one side thereof and a short radial flange 26 extending inwardly from the opposite side. It is to be noted that the hard rubber ring is spaced from the radial wall 25 and held against the radial flange 26 by the spacer ring 28. Between the hard rubber ring and the radial wall, the soft rubber ring is positioned and held by these two parts. The felt ring 30 is bedded against the soft resilient ring and contacts the shaft 21. Escape of lubricant is prevented along the surface of the shaft contacted by the felt ring.

Figure 2:
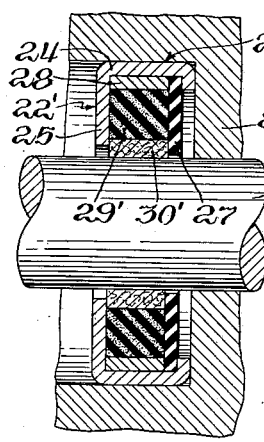

Figure 2 shows a similar construction in the seal 22', except that the felt ring 30' extends all the way across the resilient oil-resisting sponge rubber ring 29' and contacts both the hard rubber ring 27 and the radial wall of the casing.

Figure 3:
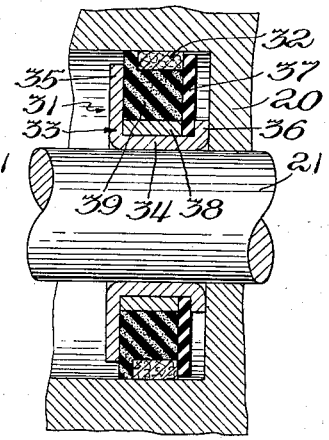

Figure 3 shows a construction similar to Figures 1 and 2, except that a felt ring 32 contacts the casing member rather than the shaft and consequently is on the outer periphery of the seal 31. This seal comprises a casing 33 formed of a cylindrical wall 34, an outwardly extending radial wall 35 at one end and an outwardly extending short radial flange 36 at the other end, a hard rubber oil resisting ring 37 being held against the flange 36 in spaced relation to the radial wall 35 by means of a metal spacer ring 38. A soft resilient oil-resisting sponge rubber ring 39 is located between the cylindrical wall and the hard rubber ring and provides a back for the felt ring 32.

Figure 4:
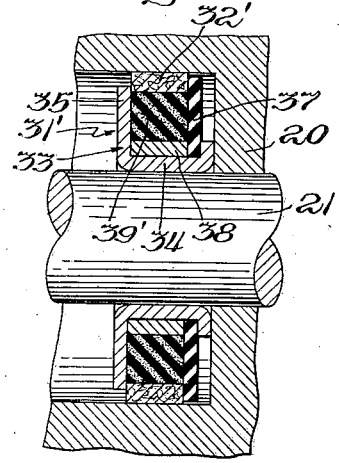

Figure 4 shows a form of seal 31' similar to that of Figure 3, differing from it only as Figure 2 differs from Figure 1, in that the felt ring 32' extends completely across the soft rubber ring 39' and contacts both the hard rubber ring 37 and the radial wall 35.

It will be seen that the four forms described are essentially the same type of seal, comprising a metal casing having a cylindrical wall and a radial wall, a hard rubber ring spaced from the radial wall, a soft rubber ring between the hard rubber ring and the radial wall and a felt ring bedded on the soft sponge rubber ring.

Figure 5:
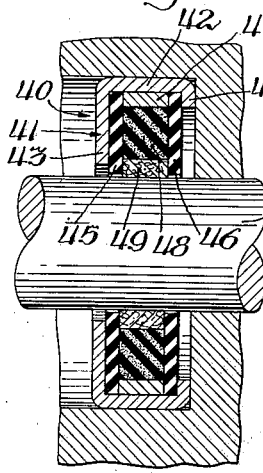

Figure 5 shows another type of seal 40 comprising a metal casing 41 having a cylindrical wall 42, a radial wall 43 and a radial flange 44, a hard rubber oil-resisting ring 45 lying in contact with the radial wall, another similar ring 46 spaced therefrom and held against the radial flange 44, a metallic spacer ring 47 lying against the cylindrical wall 42 and separating the hard rings 45 and 46, a soft resilient oil-resisting sponge rubber ring 48 between the hard rubber rings 45 and 46 and a felt ring 49. The felt ring contacts the shaft 21. It will readily be seen that the seal of Figure 5 differs only from that of Figure 2 by the addition of the second hard rubber ring 45 contacting the radial wall of the casing.

Figure 9 shows a form of seal 50 like that of Figure 5, except that the felt ring is toward the outside and contacts the housing member 20. There is a casing 51 composed of a cylindrical wall 52 having an outwardly extending radial wall 53 at one end and an outwardly extending radial flange 54 at the other end. A hard rubber ring 55 lies in contact with the radial wall 53. A similar ring 56 is positioned against the radial flange 54 and a metal spacer ring 57 lies between them in contact with the cylindrical wall of the casing. There is also a soft sponge rubber ring 58 held between the hard rubber rings, and carried on the outside of the soft rubber ring is a felt ring 59.

Figure 6:
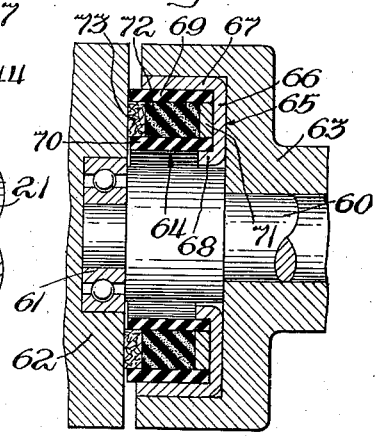

Figures 6, 7 and 8 show forms similar to Figures 5 and 9 except that the felt ring contacts a surface at right angles to the axis of the shaft which the seal surrounds. As seen in Figure 6, there is a shaft 60 supported in a roller bearing 61 on a base member 62. A casing member 63 surrounds the shaft and receives a seal 64 in an enlarged portion. There is a casing 65 composed of a radial wall 66, a cylindrical wall 67 extending from the outer edge thereof and a cylindrical flange 68 extending from the inner edge. A hard rubber ring 69 contacts the cylindrical wall of the casing and a hard rubber ring 70 of smaller diameter lies against the cylindrical flange. A metallic spacer ring 71 holds the two hard rubber rings against the cylindrical wall and cylindrical flange. A soft resilient sponge rubber ring 72 lies between the hard rubber rings and carries against one face a felt ring 73 which contacts the surface of the base member 62.

Figure 7 shows a form like that of Figure 6, except that a casing member 74 has a cylindrical wall 75 joined to the inner edge of a radial wall 76 rather than to the outer edge thereof, and a cylindrical flange 77 joined to the outer edge of the radial wall rather than to the inner.

Figure 8 is like the forms of Figures 6 and 7, except that there is no metallic ring 71 holding the two hard rubber rings apart and that a casing 78 carries a cylindrical wall 79 at the inner edge of a radial wall 80 as well as a cylindrical wall 81 at the outer edge.

It is to be noted that the forms of Figures 5 to 9, inclusive, are essentially the same type of seal and comprise a metallic casing having cylindrical and radial walls, spaced hard rubber rings, a soft sponge rubber ring held therebetween, and a felt ring bedded on the soft rubber ring.

The forms of Figures 10 and 11 differ from those of the other figures principally in that sealing is established by means of a felt ring which extends along both a cylindrical surface and a flat surface at right angles to the axis of a shaft. Figure 10 shows a seal 82. There is a casing 83 having a cylindrical wall 84 contacting the shaft 21 and a radial wall 85 extending from one edge of the cylindrical wall. A hard rubber ring 86 surrounds the cylindrical wall 84 and a metallic retaining ring 87 surrounds the hard rubber ring and lies against the radial wall 85. A soft sponge rubber ring 88 surrounds the hard rubber ring and contacts the retaining ring at one side. A felt ring 89 has a cylindrical wall 90 surrounding the soft rubber ring and a radial wall 91 in contact with a radial face of the soft rubber ring. The felt ring forms a seal along a cylindrical surface and a radial surface of the housing member 20.

The seal 92 of Figure 11 differs from the seal of Figure 10 principally in that its felt ring contacts both the shaft and the housing member. There is a casing 93 having a cylindrical wall 94 and a radial wall 95 extending from one edge thereof. A hard rubber ring 96 lies within the cylindrical wall 94 and a metallic ring 97 is in contact with the radial wall 95. A soft sponge rubber ring 98 lies within the hard rubber ring 96 and also contacts the metallic ring 97. The soft rubber ring supports a felt ring 99 having a cylindrical wall 100 in contact with a shaft 21 and a radial wall 101 extending outwardly from one edge of the cylindrical wall in contact with the housing member 20.

It will be understood that in all the forms described, both the hard rubber rings and the soft resilient sponge rubber rings will be formed of an oil resisting material such as Neoprene or its equivalent.

In all forms disclosed the seal essentially comprises an annular oil absorbing fibrous ring, such as felt placed against the surface to be sealed with a space formed by a suitable casing provided by the metal and/or hard rubber parts, such space being substantially filled with a sponge rubber packing under compression when the seal is installed between relatively movable parts, whereby the sponge rubber packing acts, as the felt ring wears, to keep the ring always sealingly pressed against the surface to be sealed. The sponge rubber packing thus expands and keeps the space in the casing fully occupied to prevent ingress of dirt or egress of oil.

It is to be further understood that the invention is not limited to the use of the various elements in ring form but may be applied where these elements take other forms.

The intention is to limit the invention only within the terms of the appended claim.

What is claimed is:

A seal for use between relatively movable parts one of which has a surface to be sealed, the seal comprising an annular casing, a fibrous oil absorbent ring in the casing partly filling same and exposed for contact with the surface to be sealed, and a sponge rubber element confined in and substantially filling the remaining space of the casing and compressed therein when the seal is installed between the relatively movable parts so as to provide resilient action on said ring to compensate for an appreciable amount of wear therein.

GEORGE M. KRIEGBAUM.